(12) United States Patent
Daykin et al.

(10) Patent No.: US 9,279,440 B2
(45) Date of Patent: Mar. 8, 2016

(54) FIXING DEVICE

(76) Inventors: Stanley Pritchard Daykin, Wiltshire (GB); Jordan Andrew Daykin, Wiltshire (GB)

(*) Notice: Subject to any disclaimer, the term of this patent is extended or adjusted under 35 U.S.C. 154(b) by 54 days.

(21) Appl. No.: 13/207,326

(22) Filed: Aug. 10, 2011

(65) Prior Publication Data
US 2013/0039715 A1 Feb. 14, 2013

(30) Foreign Application Priority Data
Aug. 8, 2011 (GB) .................................. 1113599.3

(51) Int. Cl.
| F16B 13/10 | (2006.01) |
| F16B 37/04 | (2006.01) |
| F16B 13/08 | (2006.01) |
| F16B 37/12 | (2006.01) |

(52) U.S. Cl.
CPC ........... *F16B 13/0808* (2013.01); *F16B 37/041* (2013.01); *F16B 37/122* (2013.01)

(58) Field of Classification Search
CPC ...... F16B 13/04; F16B 13/08; F16B 13/0808; F16B 21/02; F16B 37/122; F16B 37/041
USPC ........... 411/21, 347, 349, 344, 172, 173, 128, 411/976
See application file for complete search history.

(56) References Cited

U.S. PATENT DOCUMENTS

| 602,724 | A | * | 4/1898 | Butler | 411/347 |
| 604,896 | A | * | 5/1898 | Garnett | 411/347 |
| 1,159,360 | A | * | 11/1915 | Clauss | 30/270 |
| 1,541,362 | A | * | 6/1925 | Locke | 411/342 |
| 2,361,491 | A | * | 10/1944 | Nagin | 411/347 |
| 2,597,857 | A | * | 5/1952 | Francis | 411/344 |
| 2,646,713 | A | * | 7/1953 | Summerbell | 411/530 |
| 2,877,818 | A | * | 3/1959 | Johnson | 411/107 |
| 3,204,514 | A | * | 9/1965 | Sauvet | 411/385 |
| 3,503,431 | A | * | 3/1970 | Whiteside et al. | 411/353 |
| 3,956,803 | A | * | 5/1976 | Leitner | 411/349 |
| 4,372,015 | A | * | 2/1983 | Rhoton | 269/47 |
| 4,722,649 | A | * | 2/1988 | Ferguson | 411/341 |

(Continued)

FOREIGN PATENT DOCUMENTS

| EP | 0180532 A1 | 5/1986 |
| GB | 1232223 A | 5/1971 |

(Continued)

OTHER PUBLICATIONS

IPO Search report, dated Dec. 7, 2011.

(Continued)

*Primary Examiner* — Flemming Saether
(74) *Attorney, Agent, or Firm* — Crose Law LLC; Bradley D. Crose (57) ABSTRACT

A fixing device for securing into a hole in plasterboard 23, comprising: a body 1 having an anchor receiving aperture 3, and a passage 37a that extends within the body, spaced from the anchor receiving aperture 3; a shaft 5a provided within the passage 37a, the shaft 5a being rotatably movable within the passage 37a, independent of axial movement within the passage 37a; and a retaining member 19a coupled to the shaft 5a and configured to be movable between an extended position, in which the device is retainable in said hole, and a retracted position, in which the fixing device is removably insertable into said hole.

11 Claims, 8 Drawing Sheets

(56) References Cited

U.S. PATENT DOCUMENTS

| | | | | |
|---|---|---|---|---|
| 4,789,287 | A | * | 12/1988 | Le .................................. 411/107 |
| 4,828,439 | A | * | 5/1989 | Giannuzzi ....................... 411/37 |
| 5,346,349 | A | | 9/1994 | Giovannetti |
| 7,147,420 | B2 | * | 12/2006 | Baus et al. .................... 411/347 |
| 7,153,074 | B2 | * | 12/2006 | Wei ................................ 411/21 |
| 7,393,168 | B2 | * | 7/2008 | Wei ................................ 411/21 |
| 7,628,366 | B2 | * | 12/2009 | Scott ............................. 248/343 |
| 2005/0019132 | A1 | | 1/2005 | Diaz |
| 2006/0222474 | A1 | | 10/2006 | Brown |
| 2009/0113776 | A1 | * | 5/2009 | Van Bortel ..................... 40/781 |

FOREIGN PATENT DOCUMENTS

| | | |
|---|---|---|
| GB | 2052668 A | 1/1981 |
| GB | 2268240 A | 1/1994 |
| GB | 2297595 A | 8/1996 |
| GB | 2387633 A | 10/2003 |

OTHER PUBLICATIONS

IPO Search report, dated Mar. 29, 2012.

IPO Examination report, dated Mar. 29, 2012.

* cited by examiner

FIXING DEVICE

FIELD OF THE INVENTION

The present invention relates to a fixing device, a method of manufacturing the fixing device and a method of securing a fixing device in a structure. The present invention finds particular, although not exclusive, utility in providing an anchoring point in plasterboard cavity walls or ceilings for the purpose of affixing other items thereto.

BACKGROUND OF THE INVENTION

Plasterboard fixings presently available require a minimum cavity behind the plasterboard of 17 mm for light loads below 10 kg, such as pictures, wall mirrors, coat hooks and light fixings. For medium loads between 10 kg and 20 kg, such as shelves, floor supported cupboards and heaters, radiators and lighting tracks, a minimum cavity depth behind the plasterboard of 36 mm would be required. For heavy duty loads between 20 kg and 50 kg, such as wall mounted cupboards and heaters, hand rails and televisions, a minimum cavity depth behind the plasterboard of 50 mm would be required.

It is known, for instance in GB2297595A, to provide fixing means for anchoring an article to a wall, comprising a substantially cylindrical body portion comprising a central internally threaded hole. Directly either side of the hole are a pair of internally threaded holes of slightly smaller diameter. Within these holes are respective bolts, which project out of the rear face of the body portion at their tip. Firmly attached (e.g. by gluing) to the tip of each bolt is an elongate arm. The arms can be rotated relative to the body by turning the bolts such that the elongate arm projects further from the centre of the body portion. These arms engage the rear surface of a wall into which the fixing means is placed, thereby preventing removal of the fixing means from the structure.

GB2297595A seeks to improve on over-complex arrangements; however, the fixing means described is awkward to manufacture and assemble and suffers from various other shortcomings. A new fixing device is therefore sought that is easier to manufacture and assemble.

BRIEF SUMMARY OF THE INVENTION

According to a first aspect of the present invention, there is provided a fixing device for securing into a hole in plasterboard, comprising: a body having an anchor receiving aperture, and a passage that extends within the body, spaced from the anchor receiving aperture; a shaft provided within the passage, the shaft being rotatably movable, independent of axial movement, within the passage; and a retaining member coupled to the shaft and configured to be movable between an extended position, in which the fixing device is retainable in said hole, and a retracted position, in which the fixing device is removably insertable into said hole.

The fixing device may be operated, once it has been inserted into a hole in a structure, by moving the retaining member to the extended position. For instance, a hole may be drilled in a plasterboard structure for insertion of the fixing device axially therein. The fixing device may be inserted into the hole from the front face of the plasterboard, such that the retaining member is behind the rear face of the plasterboard. Rotating the shaft causes the retaining member to move from its retracted position (i.e. its ambush position, in which it sits within the axial profile of the body) to its extended position (in which it projects radially away from the body). In the extended position, the retaining member therefore substantially inhibits movement of the fixing device through the hole in the plasterboard, thus preventing removal of the fixing device from the front face of the structure. If the fixing device is recessed within the hole (either by over-insertion or if the body has a depth less than the thickness of plasterboard), then the retaining member can be drawn tight against the rear face of the plasterboard by fixing a plate (which could be, for instance, part of a hook or bracket for attachment to the plasterboard) to the front face with an anchor, received within the anchor receiving aperture. Specifically, the anchor may draw the plate and the fixing device toward each other, thereby drawing the retaining member tight against the rear face, and drawing the plate tight against the front face.

The passage may be manufactured without an internal thread. Accordingly, manufacture is easier, and the cost of production can be decreased. Similarly, the shaft may be manufactured without an external thread. Again, the manufacture of an unthreaded shaft is both easier and cheaper than the manufacture of a threaded shaft. This is especially true when considering the high tolerances involved in the production of complementary threads. Even in the case in which both passage and shaft are threaded, if the threads are not complementary (i.e. if they do not co-operatively engage with one another) assembly of the fixing device is simplified over prior art devices. In particular, the retaining member may be coupled to the shaft before insertion into the passage. Accordingly, damage to the body will not result from the welding process, and excess glue will not bond to the threads of the passage if the coupling is by gluing.

The fixing device may be a single unit, or a kit of individual pieces, comprising: an actuation member (which comprises the shaft coupled to the retaining member, as described above), and the body described above. The fixing device may be suitable for securing into structures other than plasterboard, such as dry-lining, insulated plasterboard, cladding materials, masonry brick and concrete block walls. The fixing device may be suitable for securing loads of up to 45 kg in a vertical wall. The fixing device may be suitable for securing loads of up to 75 kg in a vertical wall. The fixing device may be either releasably securable, such that it may be reused, or non-releasably securable, such that release of the fixing device is only possible via sacrificial damage to one or more of the components of the fixing device. For instance, application of a force on the fixing device of greater than 750N parallel to the axis of the anchor receiving aperture may cause the coupling between the retaining member and the shaft to fail, thereby facilitating release of the fixing device from the structure.

The body may be substantially circular in cross-section, for convenient insertion into a circular hole drilled into a structure. However, other shapes are contemplated, such as rectangular, square and hexagonal, or other polygonal forms. The body may be substantially cylindrical in order to maximise the surface area of contact with the structure, when inserted into a circular hole, thereby achieving maximum friction between fixing device and structure for preventing relative movement.

The body may have a diameter between approximately 13 mm and 25 mm. The diameter may be approximately 13 mm, 16 mm, 20 mm or 25 mm. In some embodiments, the diameter of the body on its rear face may be slightly less than the diameter of the body on its front, by for instance 0.2 mm. The depth of the body may match a standard thickness of plasterboard, such as between 9 mm and 18 mm. Preferably, it may be 9.5 mm, 11 mm, 11.5 mm, 12 mm, 12.5 mm, 15 mm or 15.5 mm so that the body will neither be proud of, nor recessed in, the surface of the plasterboard, when in use. However, it is envisaged that a body having a given depth may be used on any thickness of plasterboard, especially if that thickness is greater than the depth of the body. The diameter and depth of the body can be configured to accept different sizes and types of anchor. For instance, a larger anchor may require not only a larger anchor receiving aperture, but also a larger body.

The body may be formed from a plastics material, preferably by moulding, or from any ferrous and non-ferrous metals, white metal alloys, ceramics, lignocellulo sic materials, etc.

The anchor receiving aperture may be a hole suitable for receiving an anchor therein. The anchor receiving aperture is distinct from the shaft. The anchor receiving aperture may be between 4.5 mm and 6.8 mm in diameter. The anchor receiving aperture may be 4.5 mm, 6.5 mm or 6.8 mm in diameter. The anchor receiving aperture may be threaded, for insertion of a complementary anchor such as a bolt or screw. The thread may be integrally moulded with the body, or may be provided in a threaded insert to the body. A threaded screw could cut into an internal wall of the anchor receiving aperture, thereby producing a complementary internal thread. Alternatively, the anchor receiving aperture may be splined, for ease of manufacture. The splines may project inwardly from the circumference of the anchor receiving aperture a distance of between 1 mm and 1.25 mm. The anchor receiving aperture may comprise multi-pointed splines. The anchor receiving aperture may be located centrally in the body.

The anchor may be a nail, a screw, a bolt, or similar fastener that is suitable for fastening any item to the fixing device. Alternatively, the anchor may be a forged steel eye bolt or other fastening for further securing a component to it.

The passage may be threaded (i.e. it may have a helical groove/ridge provided on its inner surface); however, in a preferred embodiment, the passage is not threaded, for ease of manufacture. The passage may have a smooth bore. The passage may be spaced from the edge of the body by between 0.775 mm and 2.15 mm. The passage may be spaced from the edge of the body by 0.775 mm, 1.15 mm, 1.525 mm or 2.15 mm. The passage may be disposed in a recess in the body. The recess may be in a substantially circular face of the body, for instance the front face. The recess may have a maximum extension inwardly from the circumferential edge of the body of between 4 mm and 7.5 mm. The recess may have a maximum extension inwardly from the circumferential edge of the body of 4.1 mm, 4.5 mm, 5.75 mm or 7.5 mm. In this way, one end of the shaft may remain within the recess so as not to project beyond a surface of the body. The recess may be shaped to form a guide rail in the body, to aid automatic orientation of the casing during automatic assembly. The guide rail may be substantially rectangular in form, and have a width of between 5 mm and 10 mm. The guide rail may have a width of 5.2 mm, 7 mm, 8.5 mm or 10 mm. The passage may pass through the body. The passage may pass from one side of the body to another opposed side. For example, the passage may pass from a substantially circular face of the body to an opposing substantially circular face. The passage may have a circular cross-section, for axial insertion of the shaft therein, which may provide free rotation of the shaft within the passage. The passage may have a diameter of between 2.25 mm and 3.5 mm. The passage may have a diameter of 2.25 mm, 2.75 mm or 3.5 mm. Alternatively, the passage may be open sided, for facilitating radial insertion of the shaft therein. The passage may be a keyhole shape, having a cross-section that is defined by a circle abutting a dovetail shape at its narrowest part. Insertion of the shaft into the passage may be via a press-fit from the wide part of the dovetail, into the circle, via the constriction of the narrow part of the dovetail. A further slot may be provided in the surface of the body, adjacent and having an axis parallel to that of the passage. The slot may enable resilient biasing of the dovetail constriction for insertion of the shaft. The shaft may therefore be maintained within the passage due to a larger diameter of the shaft compared to the width of the dovetail constriction. Free rotation of the shaft within the passage may be provided. In this way, it may be possible to couple the shaft to the retaining member before inserting it into the passage.

The shaft may have a diameter of 2.2 mm and 3.5 mm. The shaft may have a diameter of 2.2 mm, 2.25 mm, 2.75 mm or 3.5 mm. The shaft may have a diameter less than 0.05 mm less than the diameter of the passage. The shaft may have a length chosen to correspond to the depth of the body. In one embodiment, the shaft may be 13.2 mm long, for a body of depth of 11.5 mm. The shaft may be threaded (i.e. it may have a helical groove/ridge provided on its exterior surface), although not in such a way as to form a complimentary thread to any thread in the passage. However, in a preferred embodiment, the shaft is substantially not threaded (i.e. unthreaded or smooth along at least a substantial part of its length), for ease of manufacture. The shaft may have limiting apparatus for limiting relative axial movement of the shaft within the passage. The limiting apparatus may substantially inhibit any relative axial movement of the shaft within the passage. Alternatively, the limiting apparatus may permit relative axial movement of the shaft within the passage of up to 1.5 mm, preferably approximately 1.2 mm. The limiting apparatus may be an enlarged head. For instance, at an end of the shaft opposite the retaining member may be located an approximately cylindrical body, co-axial with the shaft and having a diameter larger than that of the shaft. Alternatively, the limiting apparatus may be a non-helical, circumferential, annular or ring-like groove around the shaft provided with a spring-clip or circlip engaged therein. The groove may have a depth of between 0.375 mm and 0.6 mm, preferably 0.375 mm, 0.425 mm or 0.6 mm. The groove may have a depth of approximately 1.2 mm. The groove may be spaced from one end of the shaft by approximately 1.5 mm. The spring-clip or circlip may be manufactured from carbon steel that is phosphate and oil finished. The spring-clip or circlip may be manufactured from stainless steel or beryllium copper. The limiting apparatus may comprise the shaft being at least partially threaded, and a nut received thereon, such as a nyloc nut. The spring-clip, circlip, nut, or other limiting apparatus may be removable from the shaft.

The shaft may have an actuator for moving the retaining member between the extended position and the retracted position. The actuator may be a screw drive, for instance a slot, cross, Phillips®, Pozidrive®, hex or similar screw drive.

The retaining member may be movable between the retracted position and the extended position by axial rotation of the shaft within the passage.

The retaining member may be rigidly coupled to one end of the shaft, such as by welding or gluing; however, welding is preferred due to the increased strength provided. The retaining member may comprise a hole for receiving the shaft, and the shaft may comprise a flange against which the retaining member can be abutted for rigid coupling. The hole may have a diameter the same as the diameter of the shaft. The flange may have a diameter of between 3.5 mm and 6 mm. The flange may have a diameter of approximately 3.5 mm, 5 mm or 6 mm. The flange may have a thickness of 1 mm. The shaft may comprise knurling adjacent the flange, to improve frictional contact between the shaft and the retaining member. The hole of the retaining member and the flange of the shaft arrangement may be configured to be countersunk; i.e. the hole may be shaped to receive the flange therein, such that the shaft does not project behind the retaining member. In one embodiment, the flange is configured in the shape of a truncated cone, and the hole has a corresponding profile for contact with the curved surface of the flange.

In another embodiment, the retaining member may comprise a planar portion and a tongue that projects away from the planar portion. The tongue may be arranged to engage with a corresponding socket in the flange, when the shaft is received within the hole in the retaining member. Engagement of the tongue and socket may substantially prevent relative rotation of the shaft and retaining member, about the axis of the shaft. The tongue may hold the shaft in precisely one orientation with respect to the retaining member. The tongue and socket may have corresponding profiles. The tongue and socket may engage in a close fit. The tongue may be formed by pressing out a portion of the retaining member. The tongue may be formed by cutting a profile (for instance a partial rectangular profile) in the retaining member and folding the part inside the profile out of the plane of the retaining member. Such an arrangement obviates the need for welding, riveting or gluing the retaining member to a shaft, and enables a much simpler method of manufacture and product assembly.

The retaining member and the shaft may be manufactured from stainless steel. The retaining member and the shaft may be manufactured from carbon steel and electroplated to prevent corrosion.

The retaining member may be an arm. The arm may be of any shape or profile; however, in a preferred embodiment the retaining member is a substantially flat arm. The flat arm may have a thickness of 1.2 mm. The flat arm may be configured to have a thickness in the direction of the axis of the shaft significantly smaller than its dimensions radially from the axis of the shaft. The arm may be sized and/or configured for cutting into thermal insulation (e.g. polystyrene) behind plasterboard, such as by having sharp edges.

The fixing device's operation is not impaired by the presence of a vapour barrier plastic sheeting, or fibrous or semi-rigid insulation in the cavity walls. The flat nature of the arms permits deployment to engage in a narrow cavity less than 1.6 mm wide, and permits the cutting of its own recess in plasterboard, if necessary.

The arm may have a surface area, for contact with a planar surface, of between approximately a third of the axial cross-sectional area of the body of the fixing device and approximately equal to the cross-sectional area of the body of the fixing device. The arm may have a surface area, for contact with a planar surface, approximately a half of the cross-sectional area of the body of the fixing device.

The arm may have a surface area for contact with a planar surface of between 40 $mm^2$ and 500 $mm^2$, and a thickness of between 0.8 mm and 1.2 mm.

The fixing device may further be provided with a cap that covers the shaft, to prevent tampering therewith after the fixing device has been secured into a structure. The cap may be receivable within the anchor receiving aperture.

The body may have only one passage. Alternatively, the body may have more than one passage and the fixing device may have: a shaft provided within each or only some of the passages, the shafts being rotatably movable, independent of axial movement, within their respective passage; and a retaining member coupled to each shaft and configured to be movable between a respective extended position, in which the device is retainable in a hole, and a respective retracted position, in which the fixing device is removably insertable into said hole. Each retaining member may be a substantially flat arm having a surface area, for contact with a planar surface, equal to that of each other arm, and the total surface area, for contact with a flat surface, of all the arms may be approximately equal to the cross-sectional area of the body of the fixing device.

Each retaining member may be a substantially flat arm, and one arm may have a surface area, for contact with a planar surface, different to that of another arm, and the total surface area, for contact with a flat surface, of all the arms may be greater than the cross-sectional area of the body of the fixing device. Thus, in the retracted position, the substantially flat arms may overlap one another, but in the extended position, the fixing device may be secured more effectively, by spreading any applied load over a larger surface area than if both arms had the same surface area. Furthermore, one of the substantially flat arms may be further configured to be movable into and out of a plane coincident with another of the substantially flat arms. That is, one of the flat arms may lie substantially in a first plane, and another of the flat arms may be movable between a first location, in which it lies substantially in the first plane, and a second location, in which it lies substantially in a second plane, parallel to the first plane. In this way, the fixing device may be secured evenly, so as to prevent a load exerting a twisting force on the fixing device. For instance, in order to secure the device in a hole in a wall, the first shaft may be rotated in order to move the first flat arm from its retracted position into its extended position, then the second shaft may be moved axially to move the second flat arm into the same plane as the first flat arm, and finally the second shaft may be rotated to move the second flat arm from its retracted position into its extended position. Similarly, in order to remove the device from the hole in the wall, the reverse operation may be performed, i.e. the second shaft may be rotated to move the second flat arm from its extended position into its retracted position, the second shaft may then be moved axially to move the second flat arm out of the plane of the first flat arm, and finally the first shaft may be rotated in order to move the first flat arm from its extended position into its retracted position.

If there is more than one passage, then each one may be provided symmetrically around the body. In this way, the fixing device may be secured, in use, evenly about an axis defined by the anchor receiving aperture. However, the shafts may be provided in other configurations to suit specific needs, such as when the fixing device is in a corner or against another object, which may prevent the arms being rotated at least at one point. Each respective retaining member may have a surface area for contact with a flat surface substantially equal to the cross-sectional area of the body of the fixing device divided by the number of respective retaining members. The fixing device may further comprise a stop, for maintaining the retaining member in an optimal extended position. In this way, optimal securing of the fixing device may be achieved without an operator of the fixing device having to apply a judgement as to how much to move the retaining member in order to secure the fixing device. The optimal extended position may be the position in which maximum securing is provided by the locking arm. The stop may be a projection. The projection may be integrally formed with the body. The stop may have a diameter of between 1.3 mm and 2 mm. The stop may have a diameter of approximately 1.3 mm, 1.5 mm or 1.2 mm. The stop may have a depth of 1 mm. The stop may be located adjacent the circumferential edge of the rear of the body.

The fixing device may further comprise an anti-rotation apparatus for preventing rotation of the fixing device about an axis parallel to that of the anchor receiving aperture. In this way, insertion of an anchor into the anchor receiving aperture may be made easier, in that the fixing device may not rotate as an anchor is rotatably driven therein. The anti-rotation apparatus may comprise any number of wings parallel to the axis of the anchor receiving aperture. For instance, the anti-rotation apparatus may be a single wing parallel to the axis of the anchor receiving aperture. The anti-rotation apparatus may be a pair of wings parallel to the axis of the anchor receiving aperture, and located diametrically opposite one another. The wings may extend radially away from the outer surface of the body to thus create friction with the surface of the structure into which the device is placed so as to prohibit or, at least reduce, rotation of the device relative to the structure. The wings may cut into the structure around the hole on insertion of the fixing device into that hole. The wings may extend radially away from the outer surface of the body a distance of approximately 3 mm. The wings may have a thickness of between 1 mm and 1.5 mm. The wings may have a thickness of approximately 1 mm, 1.2 mm or 1.5 mm. The wings may have a depth equal to the depth of the body.

The fixing device may further comprise a cap that covers the shaft(s), to prevent tampering with the shaft(s) after the fixing device has been secured to a structure. The cap may be secured with an anchor into the anchor receiving aperture.

According to one embodiment of the invention, the fixing device may be assembled by: providing a body having an anchor receiving aperture and a passage that extends within the body, spaced from the anchor receiving aperture, and a shaft having an enlarged head; inserting the shaft through the passage; and coupling a retaining member to the shaft.

According to one embodiment of the invention, the fixing device may be assembled by: providing a body having an anchor receiving aperture and a passage that extends within the body, spaced from the anchor receiving aperture, and a shaft having a circumferential groove; coupling a retaining member to the shaft; inserting the shafts through the passage; and providing a circlip on the circumferential groove.

According to one embodiment of the invention, the fixing device may be assembled by: providing a body having an anchor receiving aperture and a passage that extends within the body, spaced from the anchor receiving aperture, and a shaft having an enlarged head; coupling a retaining member to the shaft; and inserting the shafts into the passage radially through an open side thereof.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may refer to different embodiments. Furthermore, the particular features, structures or characteristics of any embodiment or aspect of the invention may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may, in some embodiments, mean only one.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 1:
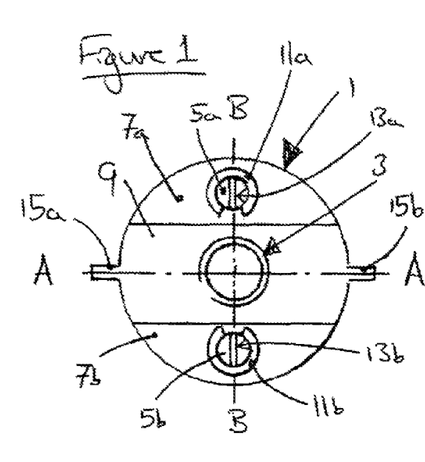
FIG. 1 is a front view of a fixing device according to a first embodiment.

FIG. 1 shows a fixing device according to a first embodiment of the present invention, comprising a body 1 of a substantially cylindrical form, having an axial depth of approximately 11.5 mm and a diameter of approximately 20 mm. The body includes an anchor receiving aperture 3, which passes axially through the body, is internally threaded, and has a diameter of approximately 6.5 mm. The body also includes shafts 5a, 5b, of a substantially rod-like shape, further described with reference to FIG. 6, below. The shafts 5a, 5b are provided within respective passages 37a, 37b (not shown in FIG. 1), which extend through the body 1, each passage having an axis parallel to, and spaced from, the axis of the anchor receiving aperture 3. The passages 37a, 37b are disposed diametrically opposite one another around the body 1, set in from the edge of the body 1, and are substantially circular in cross-section. The passages 37a, 37b are internally smooth. The passages 37a, 37b are disposed within respective recesses 7a, 7b in a surface 9 of the body 1. The recesses 7a, 7b are in the form of circular segments in the surface 9, of uniform depth, with their respective chords being parallel to one another. The portion of the surface 9 remaining forms an approximately rectangular shaped guide rail. Spring-clips 11a, 11b (shown in detail in FIG. 7) are provided around the shafts 5a, 5b, respectively, to limit axial movement of the shafts 5a, 5b. The spring-clips 11a, 11b are provided on respective circumferential grooves 39a, 39b (not shown in this figure) about one end of each shaft 5a, 5b, which limit axial movement of each shaft 5a, 5b within the passages 37a, 37b. The shafts 5a, 5b have respective slot screw drives 13a, 13b, in respective ends, for receiving a slot screw driver for rotating the shafts 5a, 5b. The body 1 is also provided with wings 15a, 15b for preventing rotation of the body 1 about the axis of the anchor receiving aperture 3. The wings 15a, 15b are substantially trapezoidal and project radially outward from the surface of the body 1, parallel to the axis of the body 1. The wings 15a, 15b are disposed diametrically opposite one another around the exterior surface body 1, offset by 90 degrees from the passages 37a, 37b.

Figure 2:
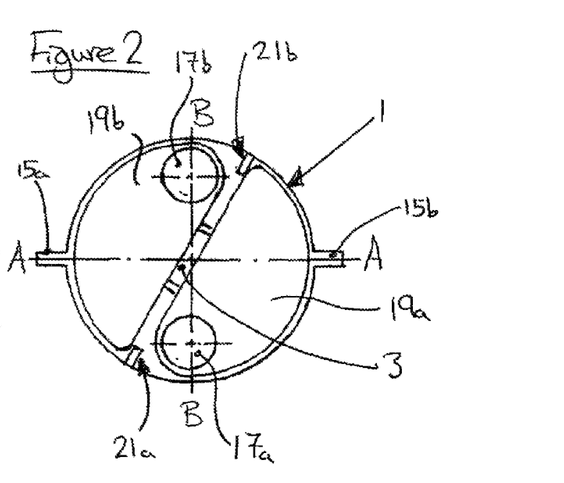
FIG. 2 is a rear view of the fixing device of FIG. 1.

FIG. 2 shows the fixing device of FIG. 1 from the reverse side. Flanges 17a, 17b, in the form of circular discs coupled to the end of the shafts 5a, 5b opposing the screw drives, are welded to respective arms 19a, 19b, which are shown in the retracted position in which they sit within the axial profile of the body. The arms 19a, 19b are flat plates of a substantially semi-circular profile, in one corner of each is a hole through which the respective shaft 5a, 5b is passed such that the respective flange 17a, 17b abuts the side of the arm 19a, 19b opposite the distal end of the shaft 5a, 5b. Rotation of a shaft 5a, 5b causes rotational movement of the respective arm 19a, 19b in the plane of FIG. 2, which is limited by a respective stop 21a, 21b in the clockwise direction and another respective stop 21b, 21a in the anti-clockwise direction. The stops 21a, 21b are integrally formed with the body 1, and project beyond the rear circular face of the body, into the plane occupied by the arms 19a, 19b.

Figure 3:
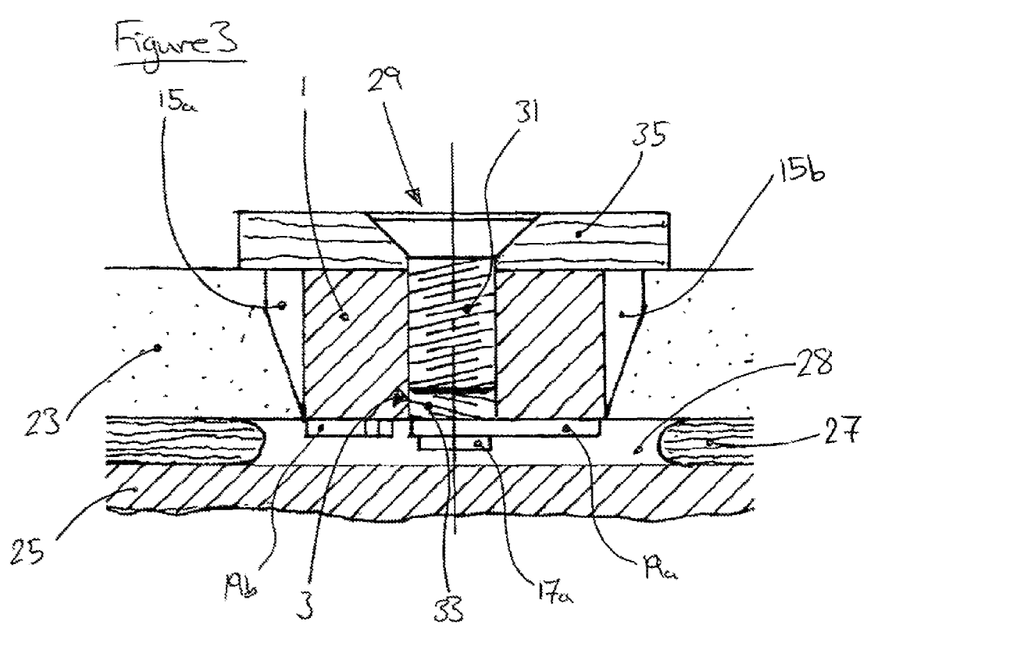
FIG. 3 is a cross-sectional view of the fixing device of FIG. 1.

FIG. 3 shows a cross-section of the fixing device along line A-A of FIGS. 1 and 2, when inserted into a wall. The arms 19a, 19b are shown in their retracted position. The wings 15a, 15b have cut into plasterboard 23, which is bonded to masonry wall 25 with adhesive 27, to form a cavity 28. The cavity 28 may vary in thickness between 10 mm and 25 mm, depending on the thickness of the adhesive 27 at the time the plasterboard 23 was placed in position against the wall 25. An anchor 29 in the form of a countersunk bolt with a screw thread 31 is shown engaged with the complementary screw thread 33 in the anchor receiving aperture 3. The anchor 29 is shown anchoring a plate 35 to the plasterboard 23 with the use of a corresponding countersink (i.e. conical hole arrangement) at one end of a through-hole in the plate 35. The plate 35 shown is a flat sheet with a depth of 3-4 mm, and having a width substantially greater than the diameter of the body 1.

Figure 4:
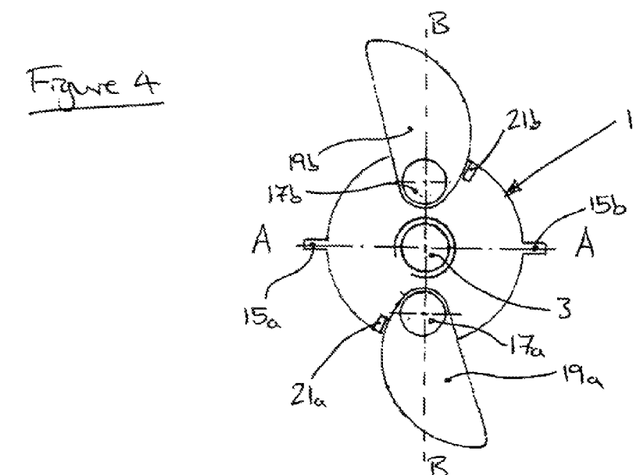
FIG. 4 is another rear view of the fixing device of FIG. 1.

FIG. 4 shows the same view of the fixing device as FIG. 2, but with the arms 19*a*, 19*b* in the optimal extended position, in which they project radially away from the body 1, in order to maximise a surface area for contact with the rear of the plasterboard 23, and abut stops 21*a*, 21*b* respectively.

Figure 5:
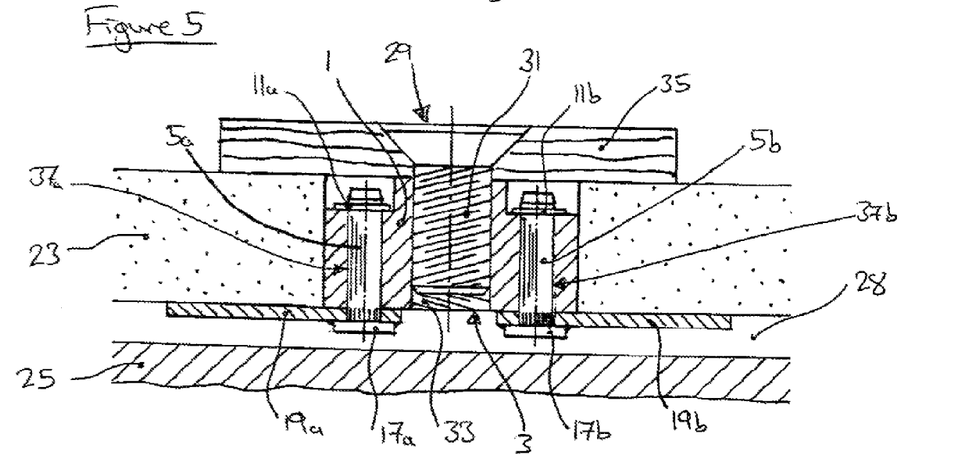
FIG. 5 is another cross-sectional view of the fixing device of FIG. 1.

FIG. 5 shows a cross-section of the fixing device along line B-B of FIG. 4, when inserted into a wall. The arms 19*a*, 19*b* are in their extended position. Shaft 5*a* is provided within passage 37*a*. The shaft 5*a* in knurled adjacent the flange 17*a* to improve contact with the arm 19*a*. If the body 1 has been over-inserted into the plasterboard 23, such that the surface 9 lies within the hole in the plasterboard, below the front of the plasterboard 23, then anchoring the plate 35 to the body 1 with the use of anchor 29 will draw the body 1 into a position flush with the surface of the plasterboard 23. For instance, tightening the anchor 29 draws the body 1 toward the plate 35, with the use of the complementary screw threads 31, 33, and thereby draws the arms 19*a*, 19*b* against the rear surface of the plasterboard 23.

Figure 6:
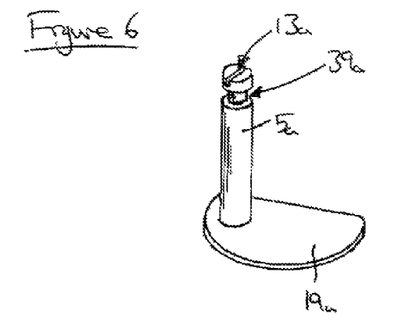
FIG. 6 is a perspective view of a component of the fixing device of FIG. 1.

FIG. 6 shows a perspective view of an actuation member in accordance with the fixing device shown in FIGS. 1 to 5 that comprises the shaft 5*a*, having a circumferential groove 39*a* for receiving the spring-clip 11*a* and the slot screw drive 13*a*, and the arm 19*a* coupled thereto, as described above.

Figure 7:
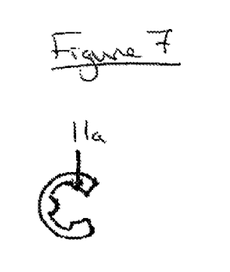
FIG. 7 is an axial view of another component of the fixing device of FIG. 1.

The shafts 5*a*, 5*b* can be individually rotated, using the slot screw drives 13*a*, 13*b*, in order to move their respective arm 19*a*, 19*b* between the retracted position and the extended position FIG. 7 shows the spring-clip 11*a* in accordance with the fixing device shown in FIGS. 1 to 6.

Figures 8, 9, 10:
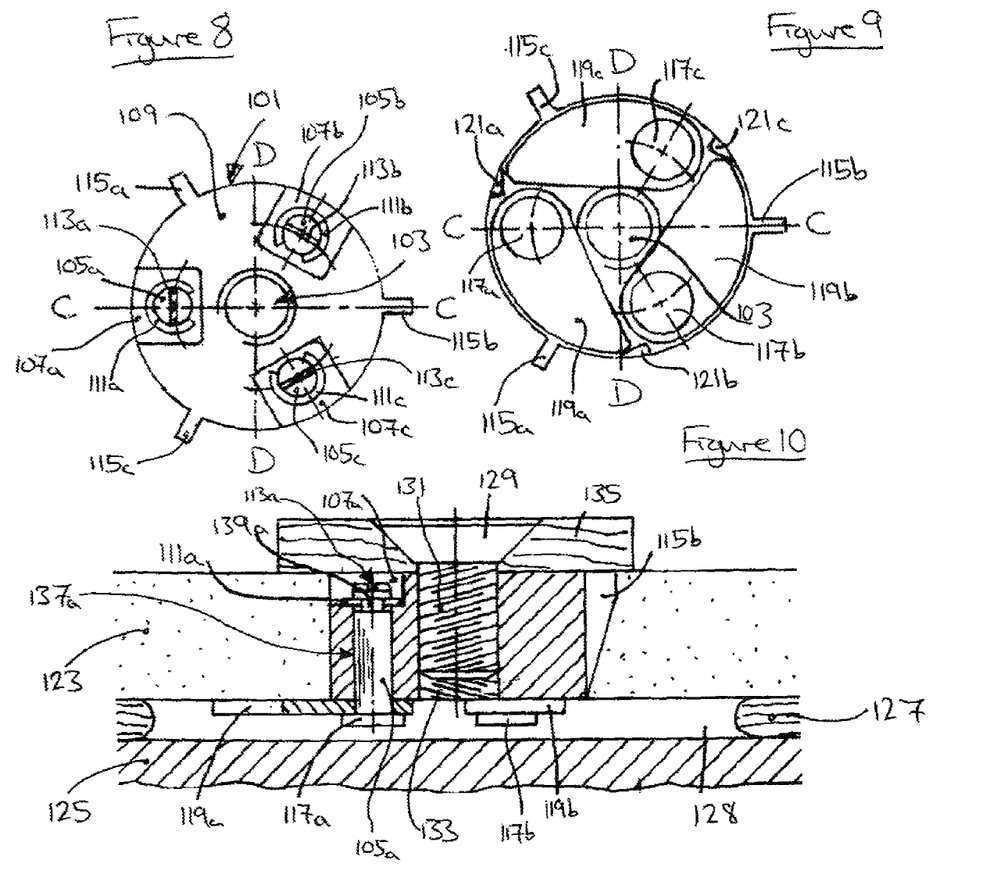
FIG. 8 is a front view of a fixing device according to a second embodiment.
FIG. 9 is a rear view of the fixing device of FIG. 8.
FIG. 10 is a cross-sectional view of the fixing device of FIG. 8.

FIG. 8 shows a fixing device according to a second embodiment of the present invention, comprising a body 101, similar to the body 1 of the previous embodiment, and an anchor receiving aperture 103, substantially the same as the anchor receiving aperture 3 of the previous embodiment. However, the fixing device comprises three shafts 105*a*, 105*b*, 105*c*, each substantially the same as the shafts 5*a*, 5*b* of the first embodiment, provided within respective passages 137*a*, 137*b*, 137*c*, each substantially the same as the passages 37*a*, 37*b* of the first embodiment, and disposed rotationally symmetrically around the axis of the body 101. The passages 137*a*, 137*b*, 137*c* are disposed within respective recesses 107*a*, 107*b*, 107*c* in a surface 109 of the body 1. The recesses 107*a*, 107*b*, 107*c* are in the form of a rectangular hollow in the surface 9, of uniform depth, each centred on its respective passage 137*a*, 137*b*, 137*c*. Spring-clips 111*a*, 111*b*, 111*c*, substantially identical to the spring-clips 11*a*, 11*b* of the first embodiment, are provided around the shafts 105*a*, 105*b*, 105*c* to limit axial movement of the shafts 105*a*, 105*b*, 105*c*. The shafts 105*a*, 105*b*, 105*c* each have slot screw drives 113*a*, 113*b*, 113*c* respectively, substantially the same as the slot screw drives 13*a*, 13*b* of the first embodiment. The body 101 is also provided with three wings 115*a*, 115*b*, 115*c*, substantially the same as the wings 15*a*, 15*b* of the first embodiment, for preventing rotation of the body 101 about the axis of the anchor receiving aperture 103. The wings 115*a*, 115*b*, 115*c* are disposed symmetrically around the exterior surface of the body 101, offset from the passages 137*a*, 137*b*, 137*c*.

FIG. 9 shows the fixing device of FIG. 8 from the reverse side. Flanges 117*a*, 117*b*, 117*c*, substantially the same as the flanges 17*a*, 17*b* in the first embodiment, provided on each of the shaft 105*a*, 105*b*, 105*c* are welded to the arms 119*a*, 119*b*, 119*c*, respectively, which are shown in the retracted position. Rotational movement of one arm 119*a* in the plane of FIG. 5 is limited by a stop 121*a* in the clockwise direction and another arm 119*b* in the anti-clockwise direction. The same limits on rotational movement of the other arms 119*b*, 199*c* apply mutatis mutandis.

FIG. 10 shows a cross-section of the fixing device along line C-C of FIGS. 8 and 9, when inserted into a wall. The arms 119*a*, 119*b*, 119*c* are in their extended position. The wings 115*a*, 115*b*, 115*c* have cut into plasterboard 123, which is bonded to masonry wall 125 with adhesive 127, to form a cavity 128. The cavity 128 may vary in thickness between 10 mm and 25 mm, depending on the thickness of the adhesive 127 at the time the plasterboard 123 was placed in position against the wall 125. An anchor 129, substantially the same as the anchor 29 of the first embodiment, with a screw thread 131 is engaged with the complementary screw thread 133 in the anchor receiving aperture 103. The anchor 129 is shown anchoring a plate 135, substantially the same as the plate 35 in the first embodiment, to the plasterboard 123 with the use of a countersunk arrangement, substantially identical to that of the first embodiment. The shaft 105*a* is provided within passage 137*a* and has a circumferential groove 139*a* provided with spring-clip 111*a*, which limits axial movement of the shaft 105*a* within the passage 137*a*. If the body 101 has been over-inserted into the plasterboard 123, then anchoring the plate 135 to the body 101 with the use of anchor 129 will draw the body into a position flush with the surface of the plasterboard 123, and thereby draw the arms 119*a*, 119*b*, 119*c* against the rear surface of the plasterboard 123, as in the first embodiment.

Figure 11:
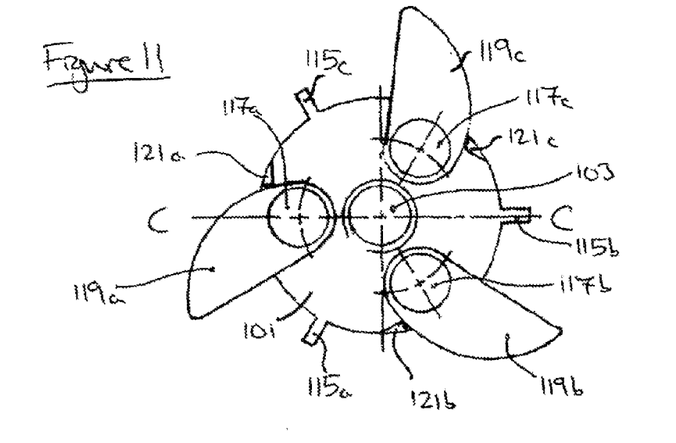
FIG. 11 is another rear view of the fixing device of FIG. 8.

FIG. 11 shows the same view of the fixing device as FIG. 9, but with the arms 119*a*, 119*b*, 119*c* shown in the optimal extended position, as in the first embodiment, abutting their respective stops 121*a*, 121*b*, 121*c*.

Figure 12:
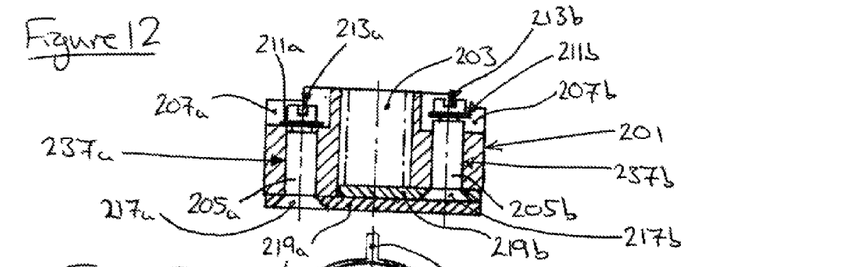
FIG. 12 is a cross-sectional view of a fixing device according to a third embodiment.

FIG. 12 shows a cross-section of a fixing device according to a third embodiment of the present invention. The body 201 is substantially cylindrical in form, having an axial depth of approximately 11.5 mm and a diameter of approximately 20 mm, and has an anchor receiving aperture 203, similar to the anchor receiving aperture 3 of the first embodiment but with a diameter of approximately 4.5 mm, and two passages 237*a*, 237*b*, substantially the same as the passages 37*a*, 37*b* of the first embodiment. The two passages 237*a*, 237*b* are disposed diametrically opposite one another around the body 201, set in from the edge of the body 201 and are provided within respective recesses in the top surface 9. The recesses 207*a*, 207*b* are each centred on their respective passage 237*a*, 237*b*, and each comprises a central sub recess and an extended top recess. Each central sub recess is in the form of a rectangular hollow in the surface 9, of uniform depth. Each extended top recess is in the form of circular segment in the surface 9, of uniform depth less than the depth of the central sub recess, with their respective chords being parallel to one another. The portion of the surface 9 remaining forms an approximately 'H' shaped guide rail. Disposed within each passage 237*a*, 237*b* is a respective shaft 205*a*, 205*b*, substantially the same as the shafts 5*a*, 5*b* of the first embodiment, each having a circumferential groove (not shown), substantially the same as the circumferential groove of the first embodiment, provided with a spring-clip 211*a*, 211*b*, substantially the same as the spring-clip of the first embodiment. At the top of each shaft 205*a*, 205*b* is a respective slot screw drive 213*a*, 213*b*, substantially the same as the screw drives 13*a*, 13*b* of the first embodiment, and at the bottom of each shaft is a respective flange 217a, 217b in the form of a countersunk head (i.e. a conical portion, flaring out from the main portion of the shaft 205a, 205b). Each flange 217a, 217b is coupled to a respective arm 219a, 219b, which are shown in their retracted position in which they sit within the axial profile of the body 201. The arms 219a, 219b are flat plates, a first plate 219a of which has a substantially circular profile, a second plate 219b or which has a substantially semi-circular profile. On a circumferential edge of each plate 219a, 219b is a hole through which the respective shaft 205a, 205b is passed such that the respective flange 17a, 17b abuts the side of the arm 19a, 19b opposite the distal end of the shaft 5a, 5b. The hole in each plate is a corresponding countersink (i.e. a conical hole arrangement) at one end of each hole. The combination of the arm 219a and the spring-clip 211a substantially prevents any axial movement of the shaft 205a within the passage 237a. In contrast, the combination of the arm 219b and the spring-clip 211b substantially limits axial movement of the shaft 205b within the passage 237b to a distance equal to the thickness of the arms 219a, 219b; that is, around 1.2 mm. Thus, the second arm 219b can therefore be moved into and out of the plane of the first arm 219a, once the first arm has been moved into its extended position. The arm 219a has a larger surface area than the arm 219b.

Figure 13:
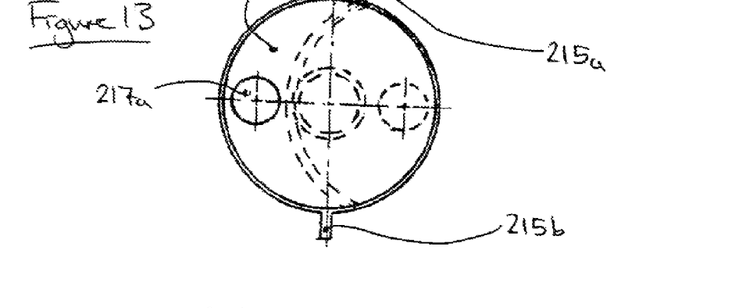
FIG. 13 is rear view of the fixing device of FIG. 12.

FIG. 13 shows an underside view of the fixing device of FIG. 12, which has wings 215a, 215b, substantially the same as the wings 15a, 15b in the first embodiment, provided on the body 201.

Figure 14:
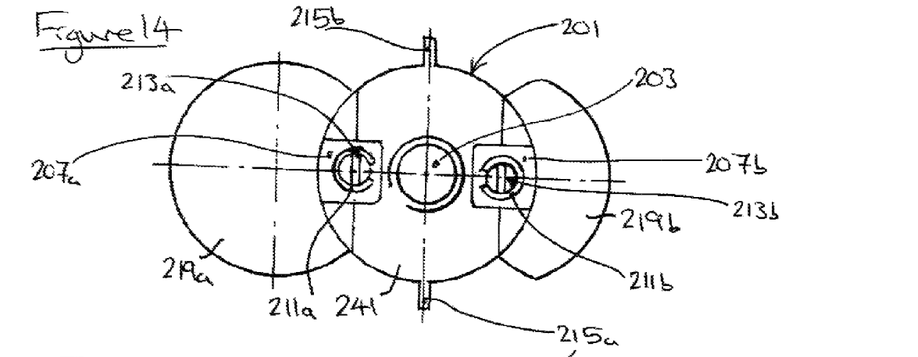
FIG. 14 is a front view of the fixing device of FIG. 12.

FIG. 14 shows a top view of the fixing device of FIGS. 12 and 13, in which the arms 219a, 219b are located in the extended position. The recesses 207a, 207b are shaped to form a guide rail 241 in the top surface of the body 201, to assist the automatic orientation of the body during automatic assembly of the fixing device.

Figure 15:
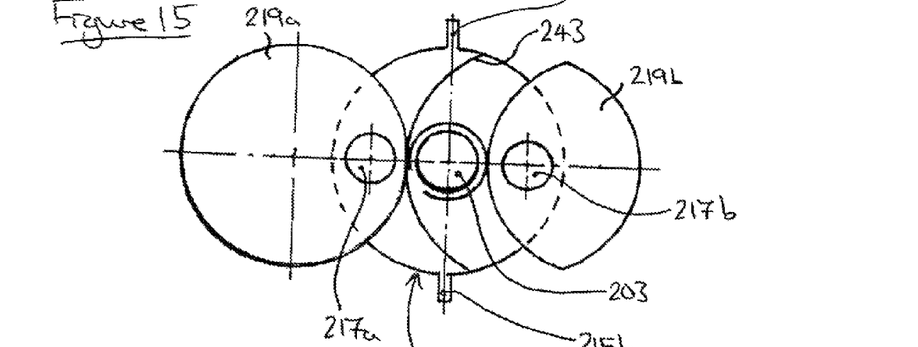
FIG. 15 is another rear view of the fixing device of FIG. 12.

FIG. 15 shows the same view of the fixing device as FIG. 13, but with the arms 219a, 219b in the optimal extended position. A hollow 243 is provided in the rear surface of the body 201 for accommodating the second arm 219b when both arms 219a, 219b are in the retracted position. The first shaft 205a can be rotated in order to move the first arm 219a from its retracted position into its extended position, then the second shaft 205b can be moved axially to move the second arm 219b into the same plane as the first arm 219a, and finally the second shaft 205b can be rotated to move the second arm 219b from its retracted position into its extended position. Similarly, the second shaft 205b can be rotated to move the second arm 219b from its extended position into its retracted position, the second shaft 205b can then be moved axially to move the second arm 219b out of the plane of the first arm 219a, and finally the first shaft 205a can be rotated in order to move the first arm 219b from its extended position into its retracted position.

Figure 16:
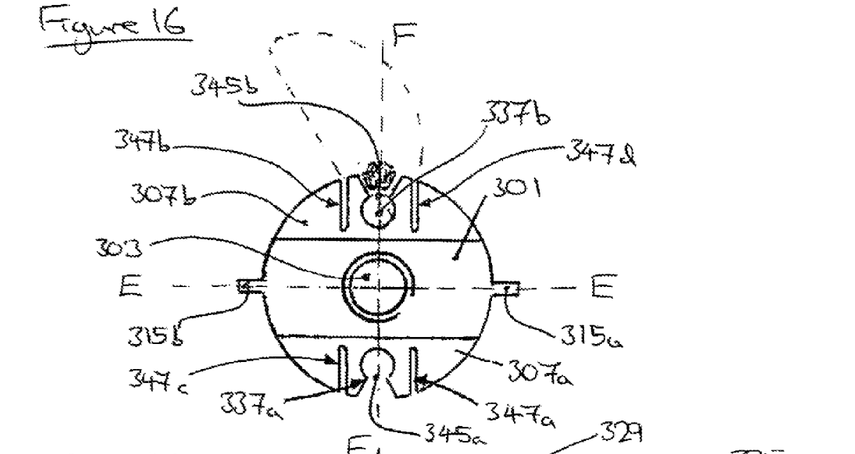
FIG. 16 is a front view of a component of a fixing device according to a fourth embodiment.

FIG. 16 shows a body 301 of a fixing device according to a fourth embodiment of the present invention. The body 301 is of a substantially cylindrical form, having an axial depth of approximately 11.5 mm and a diameter of approximately 20 mm. The body 301 has an anchor receiving aperture 303, which passes axially through the body 301, is internally threaded, and has a diameter of approximately 6.5 mm. The body 301 also includes two passages 337a, 337b that extend through the body 301, each passage 337a, 337b having an axis parallel to, and spaced from, the axis of the anchor receiving aperture 303. The two passages 337a, 337b are disposed diametrically opposite one another around the body 301, set in from the edge of the body 301, and are provided within respective recesses 307a, 307b, substantially the same as recesses 7a, 7b of the first embodiment, in the top surface.

Each passage 337a, 337b has an open-sided keyhole-shaped cross-section, and includes a constriction 345a, 345b for retaining a shaft within the circular portion of the keyhole shape. Either side of each passage 337a, 337b are provided two slots 347a, 347c and 347b, 347d, respectively, each projecting semi-radially inward from the outer surface of the body 301 and running parallel to the axis of the passages 337a, 337b. The slots 347a, 347c, 347b, 347d enable resilient biasing of the side walls of the shafts 337a, 337b to allow insertion of a shaft 305a, 305b radially into the circular portion of the keyhole shape, via the constriction 345a, 345b. A shaft 305a can be inserted radially into the flared portion of the keyhole shaped passage 337a. If a pressure is applied to the shaft 305a radially, then the shaft 305a can force the side walls of the passage 337a apart, widening the constriction 345a. The shaft 305a can then move into the circular portion of the keyhole shaped passage 337a, and the constriction 345a returns to its original size. The body 301 is also provided with two wings 315a, 315b, substantially the same as the wings 15a, 15b of the first embodiment, diametrically opposed around the circumference of the body 301, and offset from the passages 337a, 337b.

Figure 17:
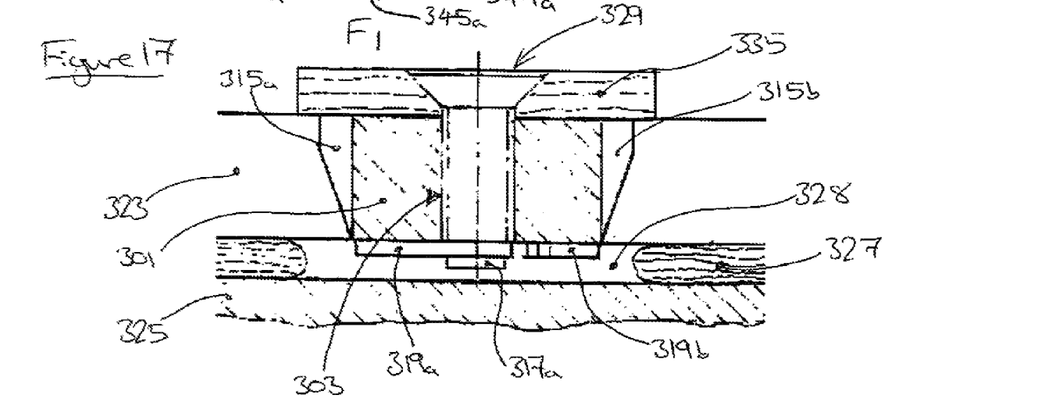
FIG. 17 is a cross-sectional view of a fixing device incorporating the component of FIG. 16.

FIG. 17 shows a cross-section along line E-E of a fixing device having the body shown in FIG. 16, when inserted into a wall. The arms 319a, 319b, substantially the same as the arms 19a, 19b of the first embodiment, are shown in their retracted position. The arms 19a, 19b are coupled to respective flanges 317a, 317b, substantially the same as the flanges of the first embodiment. The wings 315a, 315b are shown having cut into plasterboard 323, which is bonded to masonry wall 325 with adhesive 327, to form a cavity 328. The cavity 328 may vary in thickness between 10 mm and 25 mm, depending on the thickness of the adhesive 327 at the time the plasterboard 323 was placed in position against the wall 325. An anchor 329, substantially the same as the anchor 29 of the first embodiment, is located in the anchor receiving aperture 303. The anchor 329 anchors a plate 335, substantially the same as the plate 35 of the first embodiment, to the plasterboard 323 with the use of a countersunk arrangement.

Figures 18, 19:
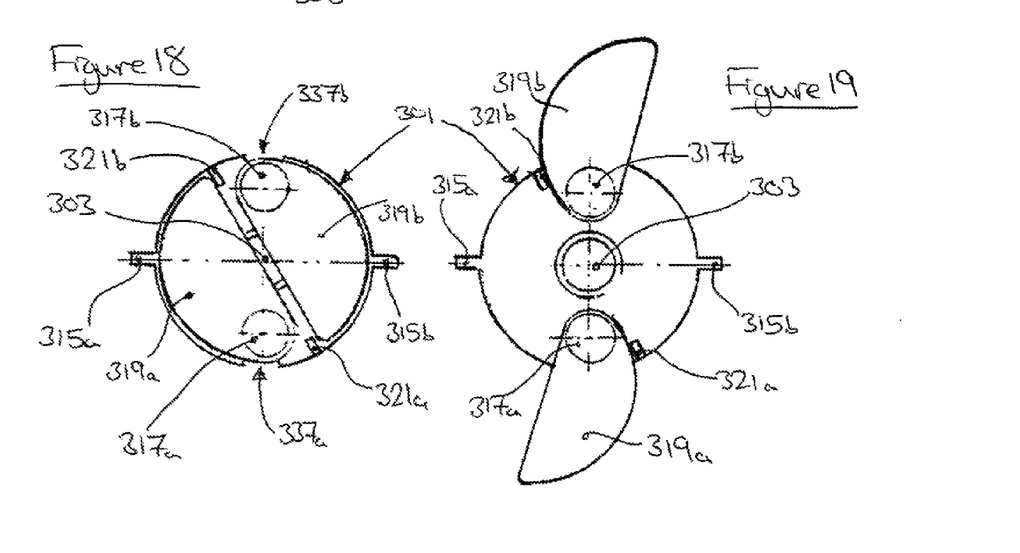
FIG. 18 is a rear view of the fixing device of FIG. 17.
FIG. 19 is another rear view of the fixing device of FIG. 17.

FIG. 18 shows a rear view of the fixing device shown in FIG. 17, with the arms 319a, 319b shown in the retracted position. The body 301 is provided with stops 321a, 321b, substantially the same as the stops 21a, 21b of the first embodiment.

FIG. 19 shows the same view of the fixing device as FIG. 18, but with the arms 319a, 319b in the optimal extended position, abutting stops 321a, 321b respectively.

Figure 20:
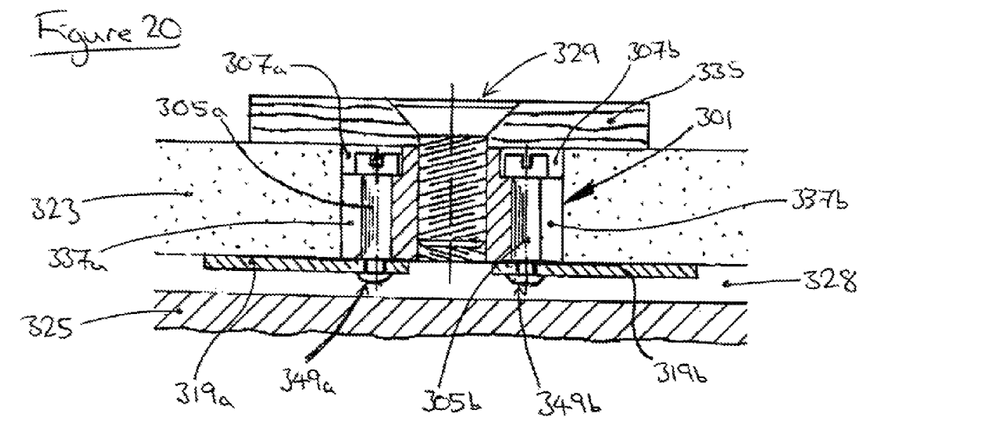
FIG. 20 is a cross-sectional view of a fixing device according to a fifth embodiment.

FIG. 20 shows a cross-section along line F-F of a fixing device according to a fifth embodiment, having the body shown in FIG. 16, when inserted into a wall. The arms 319a, 319b have been coupled to their respective shafts 305a, 305b using respective flanges 349a, 349b. The flanges 349a, 349b are each formed in a mushroom shape comprising a narrow portion, for insertion through a hole in one of the arms 319a, 319b, and a head portion for retaining the arm 319a, 319b on the shaft, the head portion having a larger diameter than that of the hole. The narrow portion of the flange 349a, 349b is passed through the hole in the arms 319a, 319b, before coupling securely to the main part of the shaft 305a, 305b. Welding the flange 349a, 349b to the arm 319a, 319b secures the two components together.

Figure 21:
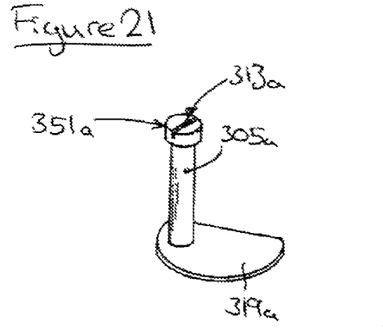
FIG. 21 is a perspective view of a component of the fixing device of FIG. 20.

FIG. 21 shows a perspective view of an actuation member in accordance with the fixing device shown in FIG. 20 that comprises a shaft 305a, having an enlarged head 351a and a slot screw drive 313a, and an arm 319a coupled thereto. The enlarged head 351a is substantially cylindrical in shape, and is positioned axially at one end of the shaft. The diameter of the enlarged head is larger than the diameter of the shaft and the diameter of the circular cross-section portion of the passage 337a. The enlarged head therefore substantially limits axial movement of the shaft through the passage.

Figure 22:
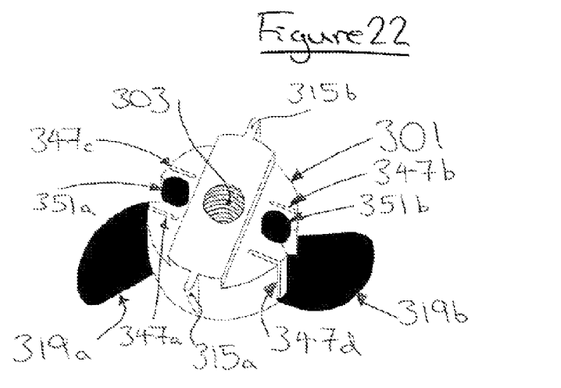
FIG. 22 is a perspective view of the fixing device of FIG. 20.

FIG. 22 shows a perspective view of the fixing device shown in FIG. 20, with the arm 319a, 319b shown in the extended position.

Figure 23:
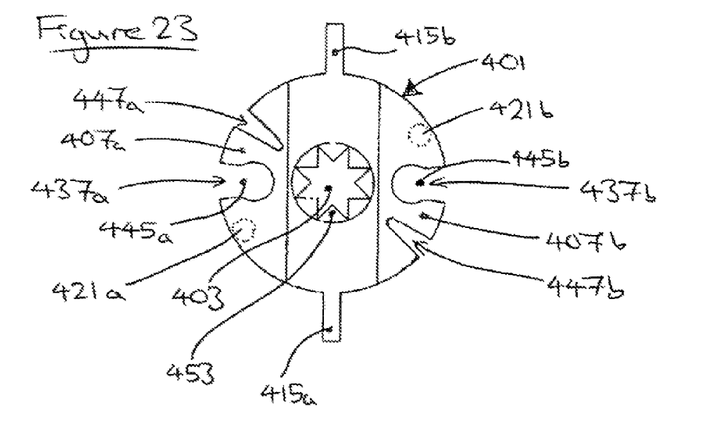
FIG. 23 is a front view of a component of a fixing device according to a sixth embodiment.

FIG. 23 shows a body 401 of a fixing device according to a sixth embodiment of the present invention. The body 401 is of a substantially cylindrical form, having an axial depth of approximately 11.5 mm and a diameter of approximately 16 mm. The body 401 has an anchor receiving aperture 403, which passes axially through the body 401, is provided splines 453 that project radially into the centre of the anchor receiving aperture 403, and has a diameter of approximately 4.5 mm. The body 401 also includes two passages 437a, 437b that extend through the body 401, each passage 437a, 437b having an axis parallel to, and spaced from, the axis of the anchor receiving aperture 403. The two passages 437a, 437b are disposed diametrically opposite one another around the body 401, set in from the edge of the body 401, and are provided within respective recesses 407a, 407b, substantially the same as recesses 7a, 7b of the first embodiment, in the top surface. Each passage 437a, 437b has an open-sided keyhole-shaped cross-section, and includes a constriction 445a, 445b for retaining a shaft within the circular portion of the keyhole shape. On one side of each passage 437a, 437b is provided a slot 447a, 447b, respectively, each projecting radially inward from the outer surface of the body 401 and running parallel to the axis of the passages 437a, 437b. The slots 447a, 447b, enable resilient biasing of one of the side walls of the shafts 437a, 437b to allow insertion of a shaft 305a, 305b radially into the circular portion of the keyhole shape, via the constriction 445a, 445b. A shaft 305a can be inserted radially into the flared portion of the keyhole shaped passage 437a. If a pressure is applied to the shaft 305a radially, then the shaft 305a can force the side walls of the passage 437a apart, widening the constriction 445a. The shaft 305a can then move into the circular portion of the keyhole shaped passage 437a, and the constriction 445a returns to its original size. The body 401 is also provided with two wings 415a, 415b, substantially the same as the wings 15a, 15b of the first embodiment, diametrically opposed around the circumference of the body 401, and offset from the passages 437a, 437b.

Figures 24, 25:
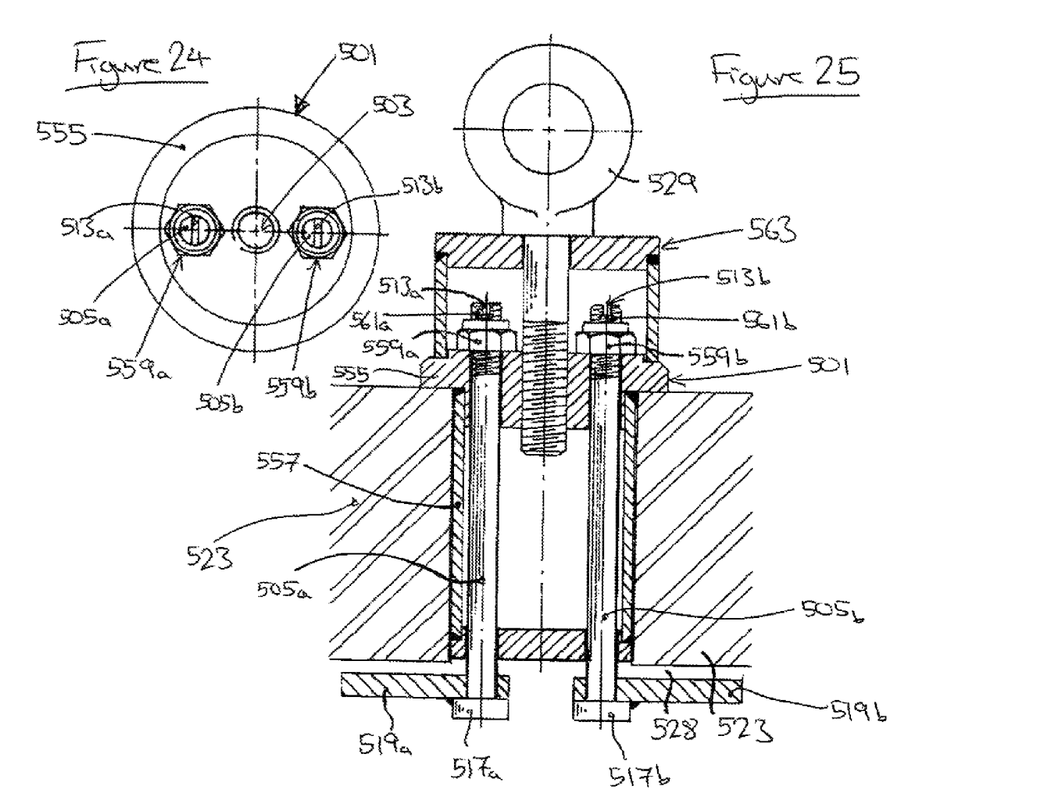
FIG. 24 is a front view of a fixing device according to a seventh embodiment.
FIG. 25 is a cross-sectional view of the fixing device of FIG. 24.

FIG. 24 shows a fixing device according to a seventh embodiment of the present invention, comprising a body 501, being substantially cylindrical in shape and defining a hollow cavity therein. The body 501 has a diameter for insertion into a hole of approximately 13 mm and a depth of approximately 17 mm. The body 501 includes a casing 557, configured to sit within a hole in a plasterboard sheet, and an integral plate 555 that forms the top surface of the body 501, and has a diameter larger than the diameter for insertion into a hole, of approximately 14 mm. The body 501 is provided centrally with a threaded anchor receiving aperture 503 in the integral plate 555 that extends from the top surface of the body 501 into the hollow cavity. The body is further provided with first and second shafts 505a, 505b, provided within respective first and second passages that are parallel to and axially spaced from the axis of the anchor receiving aperture 503, and extend from the top surface of the body 501, through the hollow cavity to the lower surface of the body 501. The passages are unthreaded, and circular in cross-section. Nuts 559a, 559b are provided on top ends of the respective shafts 505a, 505b. Each shaft 505a, 505b is provided with a respective slot screw drive 513a, 513b, also on their top ends, substantially the same as the screw drives 13a, 13b of the first embodiment.

FIG. 25 shows the fixing device of FIG. 24 inserted into plasterboard 523. Each shaft 505a, 505b is threaded 561a, 561b at its top end in order to threadably receive a respective nut 559a, 559b thereon. Each shaft 505a, 505b has at a flange 517a, 517b disposed on its lower end for the coupling of a respective arm 519a, 519b thereto. The flanges 517a, 517b, arms 519a, 519b and their mechanism for coupling are substantially the same as described in respect of flanges 17a, 17b and arms 19a, 19b in the first embodiment. Movement of the arms 519a, 519b between their respective extended and retracted positions is substantially the same as that described in the first embodiment with respect to arms 19a, 19b. The shafts 505a, 505b may be individually rotated in order to move the arms 519a, 519b from a retracted position into the extended position shown in FIG. 25. Tightening the nuts 559a, 559b on the shafts 505a, 505b draws the arms 519a, 519b against the rear surface of the plasterboard 523 adjacent the cavity 528. Pressure between the arms 519a, 519b and the integral plate 555 holds the fixing device securely in the plasterboard 523. A forged steel eye bolt 529 is threadably received in the anchor receiving aperture 503. The forged steel eye bolt 529 secures a cap 563 over the integral plate 555 such that access to the nuts 559a, 559b is prevented without removal of the cap 563. The cap 563 is substantially cup-shaped, and includes a hole in its flat end for receiving the forged steel eye bolt 529 therethrough.

Figures 26, 27:
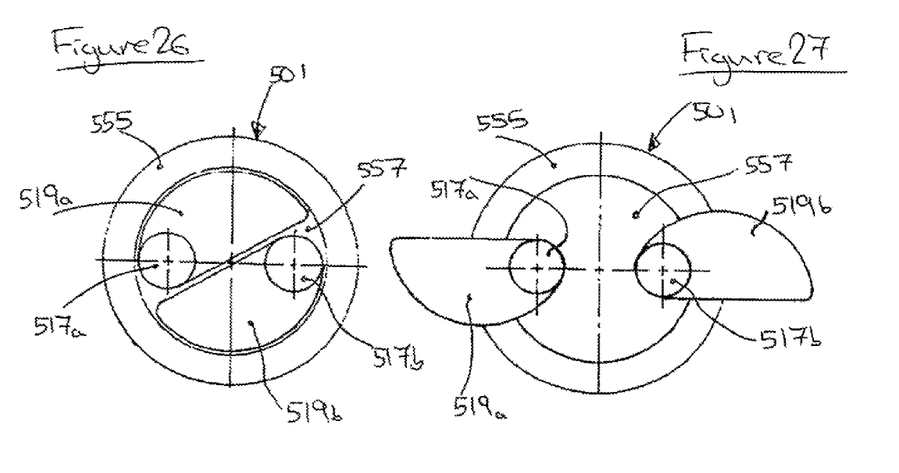
FIG. 26 is a rear view of the fixing device of FIG. 24.
FIG. 27 is another rear view of the fixing device of FIG. 24.

FIG. 26 shows a rear view of the fixing device of FIGS. 24 and 25 with the arms 519a, 519b shown in the retracted position.

FIG. 27 shows the same view as FIG. 26, but with the arms 519a, 519b shown in the extended position.

Figure 28:
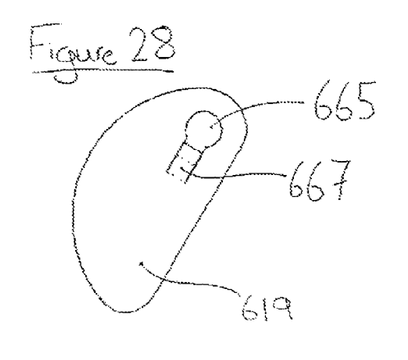
FIG. 28 is a rear view of an arm according to an eighth embodiment.

FIG. 28 shows an arm 619 according to an eighth embodiment, having a hole 665 therethrough at one end, and a tongue 667 adjacent the hole 665. The tongue is formed by partially cutting out a portion of the flat arm 619, which is then bent out of the plane of the flat arm 619.

Figure 29:
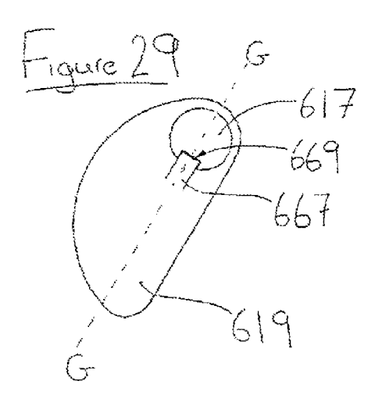
FIG. 29 is a rear view of an arm and shaft arrangement according to the eighth embodiment.

FIG. 29 shows the arm 619 having a shaft (605, not shown) located within the hole 665. At one end of the shaft 605 is a flange 617. The shaft 605, excluding the flange 617, may be configured in the same way as any shaft previously described herein. The flange 617 has a socket 669 for receiving the tongue 667 therein, when the shaft 605 has been fully inserted into the hole 665. The socket 669 is sized to receive the tongue 667 in a close fit, so that there is substantially no rotational movement between the shaft 605 and the arm 619, about the axis of the shaft 605.

Figure 30:
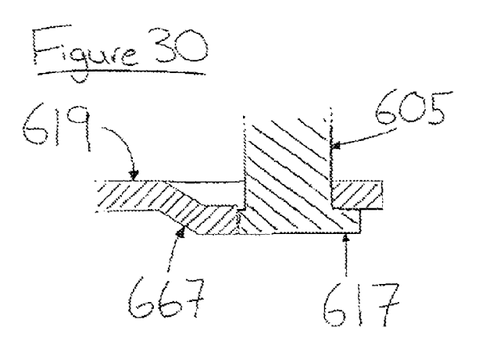
FIG. 30 is a cross-sectional view of the arrangement of FIG. 29.

FIG. 30 shows a partial cross section of the arrangement of FIG. 29 along the line G-G. The flange 617 abuts the rear face of the arm 619 to prevent axial movement of the shaft 605 in one direction through the hole 665. The shaft may comprise limiting apparatus such as an enlarged head or a circlip, as hereinbefore described. Once the shaft 605 is inserted into a passage of a fixing device body, the arm 619 is held between the rear surface of the body and the flange 617, so as to prevent any movement of the arm 619 along the axis of the shaft 605. Further, the engagement of the tongue 667 with the socket 669 prevents any movement of the arm 619 rotationally about the axis of the shaft 605, relative to the shaft 605. Accordingly, rotation of the shaft 605 about its axis causes corresponding rotation of the arm 619 about the shaft's 605 axis.

The invention claimed is:

1. A fixing device for securing into a hole in plasterboard, comprising:
   a body being cylindrical, having a depth of between 9 mm and 18 mm a circular cross-section, having a threaded anchor receiving aperture coaxial with the body, and having a first passage and a second passage, each of said first passage and said second passage arranged to extends within the body, spaced from the anchor receiving aperture;

a first shaft provided within the first passage, and a second shaft provided within the second passage, each of the first and second shafts being rotatably movable, independent of axial movement, within the respective first and second passage, each of the first and second shafts having respective limiting apparatus for limiting relative axis movement of the respective shaft within the respective passage;

a first retaining member in the form of a flat plate of semi-circular profile coupled to the first shaft, and a second retaining member in the form of a flat plate of semi-circle profile coupled to the second shaft, each of the first and second retaining members having a thickness of between 0.8 mm and 1.2 mm, and configured to be movable between a respective extended position, in which the fixing device is retainable in said hole, and a respective retracted position, in which the fixing device is removably insertable into said hole, wherein each of the first and second retaining members has a surface area equal to one half of the circular cross-section of the body;

at least one wing for preventing rotation of the fixing device about first axis parallel to the anchor receiving aperture, wherein the at least one wing is substantially trapezoidal and projects radially outward from the body, parallel to the first axis;

a first recess and a second recess in a circular face of the body, each of the first and second recesses being in the form of a circular segment having a uniform depth, wherein the first passage is disposed in the first recess and eth second passage is disposed in the second recess, such that each respective limiting apparatus remains within the recess at a level defined below a top of the body; and a rectangular guide rail in the circular face of the body, the rectangular guide rail formed by the circular segment forms of the first and second recesses for orientation of the fixing device.

2. The fixing device of claim 1, in which each of the first and second passages has a smooth bore.

3. The fixing device of claim 1, in which each of the first and second passages has a circular cross-section, for axial insertion of each of the first and second shafts respectively therein.

4. The fixing device of claim 1, in which each of the first and second shafts is smooth.

5. The fixing device of claim 1, in which the limiting apparatus substantially inhibits any relative axial movement of the respective one of the first and second shafts within the respective one of the first and second passages.

6. The fixing device of claim 1, in which the limiting apparatus permits relative axial movement of the respective one of the first and second shafts within the respective one of the first and second passages of up to 1.5 mm.

7. The fixing device of claim 1, in which the limiting apparatus is an enlarged head, a circumferential groove around the respective one of the first and second shafts provided with a spring-clip engaged therein, or a nyloc nut received upon a threaded end of the respective one of the first and second shafts.

8. The fixing device of claim 1, in which each of the first and second shafts has an actuator for moving the retaining member between the extended and retracted positions.

9. The fixing device of claim 1, further comprising a cap that covers the shaft, to prevent tampering therewith after the fixing device has been secured to a structure.

10. The fixing device of claim 1, in which each of the first and second retaining members comprise:
a hole therethrough at a first end thereof, and
a tongue adjacent to the hole, the tongue formed by partially cutting out a portion of the flat plate, and bending out the portion from a plane of the flat plate; and
each of the first and second shafts is located within the hole of a respective one of the first and second retaining members, and each of the first and second shafts comprises a flange at one end thereof arranged to abut one face of the flat plate to prevent axial movement of the shaft in one direction through the hole, such that the flat plate is held between a rear surface of the body and the flange, so as to prevent any movement of the flat plate along a longitudinal axis of the hole;
wherein the flange comprises a socket for receiving the tongue therein, such that there is substantially no relative rotational movement between the shaft and the flat plate, about the longitudinal axis of the hole.

11. The fixing device of claim 10, in which the portion of the flat plate is bent out only partially from the plane of the flat plate, such that part of the tongue remains in the plane of the flat plate thus improving the resistance to shear forces.

* * * * *